United States Patent
Busch

[15] 3,653,025
[45] Mar. 28, 1972

[54] SIGNALLING SYSTEM

[72] Inventor: Theodore N. Busch, Minneapolis, Minn.

[73] Assignee: Caswell Equipment Company, Incorporated, Minneapolis, Minn.

[22] Filed: Aug. 4, 1969

[21] Appl. No.: 847,127

[52] U.S. Cl. ....................340/323, 340/331
[51] Int. Cl. ....................G08b 5/00
[58] Field of Search ....................340/323, 331

[56] References Cited

UNITED STATES PATENTS 3,009,140 11/1961 Gordon....................340/323

*Primary Examiner*—John W. Caldwell
*Assistant Examiner*—Michael Slobasky
*Attorney*—L. A. MacEachron

[57] ABSTRACT

A loop communicating system in which the loop is conductors alternated with diodes. A partial loop electrical circuit has brushes that contact the loop so as to complete the partial loop using a single conductor of the loop or, by contacting two conductors of the loop, incorporated the diode between two conductors into the partial loop. The differences between these two arrangements electrically is used to signal the changes in position of the partial loop on the loop.

1 Claims, 3 Drawing Figures

INVENTOR
THEODORE N. BUSCH
BY L. A. MacEachron
ATTORNEY

SIGNALLING SYSTEM

BACKGROUND OF THE INVENTION

The invention grew out of a need for a communication system between fixed and moving stations with the economy of a series circuit but at least the flexibility of a parallel circuit. The particular physical embodiment of the invention, a target carrier, also required a system that would offer the minimum chance of damage from stray bullets. While a radio system is capable of solving all of the problems of flexibility and now with solid-state electronics would probably be sufficiently resistant to shock, it is considerably more difficult to maintain which adds to the initial economic disadvantage of radio control. Previous systems have either been very elaborate and costly or had all of the limitations that mechanical and parallel circuits have.

SUMMARY OF THE INVENTION

The invention is a signalling or communication circuit of the conductor type to distinguish it from so called wireless communication. It is a circuit for communicating between fixed and movable stations in which the message conductor comprises elements offering different opposition to current flow and connected to each other in a repeating sequential pattern.

The system seems to function best when the opposition to current flow contrast is greatest. While there are many elements that offer varying resistance to current flow, none offers greater contrast than switches. By using switches, opposition to current flow may be changed suddenly from total to nearly zero or the reverse. An element that is an electrical switch in action is a one direction current flow device such as a diode or rectifier. When it is included in a circuit oriented one way it offers nearly no opposition to current flow and in the reverse orientation opens the circuit practically speaking. Situations calling for a very rugged system are ones in which the one-direction current flow type electrical switch is the preferred element. Using this type of switch offers only one limitation not encountered with other switches. When the one-direction electrical switch is used, the power source must be in the partial loop, described below.

In the specific form of the invention disclosed here, the switching elements used are elements that will allow current to flow in one direction only such as rectifiers or diodes. This structure permits a particularly rugged structure that is very desirable for the shooting gallery use for which the system was initially evolved. These one direction units are coupled by elements which conduct current in both directions. Together these elements forming the message conducting portion will be called the loop hereafter.

A second portion of the circuit is a partial loop that may be variously connected to the loop by variable connectors such as brushes which term is here used generally to mean variable connectors. Since the partial loop may incorporate various parts of the loop, it may be thought of as a variable loop. Therefore the coined term vari-loop is used to distinguish it from the loop. Sometimes the vari-loop may include only bi-directional members of the loop as when the brushes are between uni-directional elements. The opposition to flow of current between the brushes by the shortest route is then nearly zero. When a one-directional element is bridged, however, the direct path for current flow is blocked and the resistance between the brushes by the shortest physical route is for practical purposes total. This action may be achieved by having the power source originate in the vari-loop and be uni-directional in a direction that permits current to be blocked between the brushes but not if the current flows through the entire loop with the exception of the bridged uni-directional device. Another way of stating this is that the vari-loop and loop are moved in relation to each other causing the brushes to be alternately connected by parts of the loop offering different opposition to current flow so as to generate a signal that may be used to communicate where the loop and vari-loop are in relation to each other. When the vari-loop is positioned so as to include most of the loop, opening and closing either of the loop or the vari-loop will communicate a signal to the other. A practical embodiment of the system is described in detail in connection with the accompanying drawings which are briefly described below:

DESCRIPTION OF THE INVENTION

Figures 1, 2, 3:
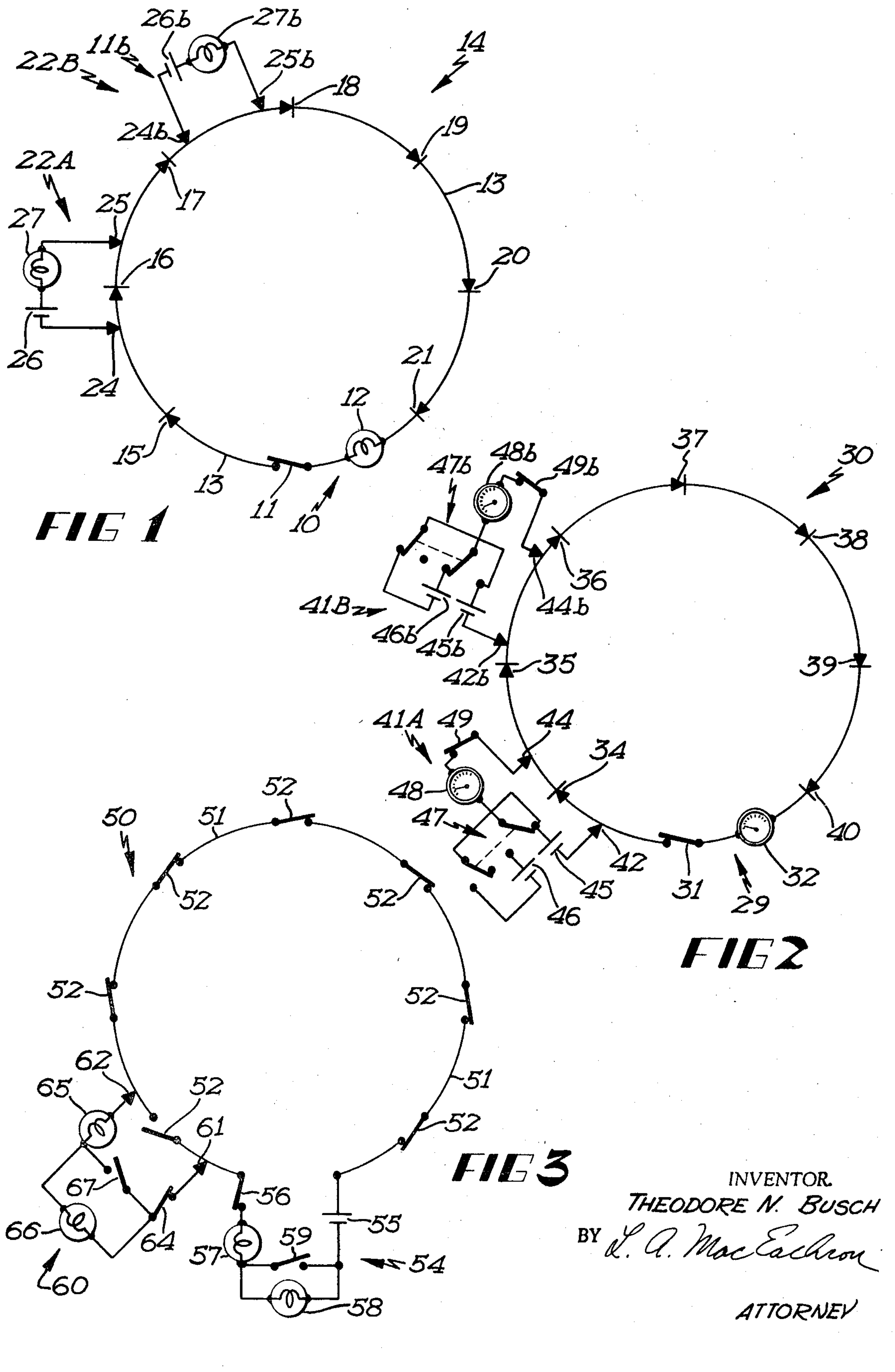
FIG. 1 is a wiring diagram of the circuit.
FIG. 2 is a similar diagram of a variation of the circuit.
FIG. 3 is a wiring diagram of a circuit that is another variation of FIG. 1.

In FIG. 1 a station 10 is provided with a suitable control device exemplified by switch 11 and a signal recognizing device here shown as lamp 12. Station 10 is seen to be part of loop 14 which is made up of elements that offer different resistance to the flow of current. Here only two elements are used one of which is the one-direction current flow devices 15–21, reading clockwise around the loop 14 beginning just to the left of switch 11. For the practical embodiment for which this invention was made, solid state diodes seem to have most satisfactory characteristics. Rectifiers such as Selenium and Germanium rectifiers or vacuum tube rectifiers will also function on the same basic logic. These one-direction current flow elements, hereafter called diodes for brevity, are linked by elements that permit current flow in both directions in this case the conductors 13.

A second station 22 is variously connected to the loop 14 by suitable variable connectors such as the brushes 24 and 25. Station 22 also includes a source of electrical energy 26 and resistance 27 which may also serve as a signal recognizing device. This station for brevity is designated by the coined term vari-loop. This name derives from the fact that stations 22 and 41 vary in their electrical make-up as the brushes make different contacts with the loop in the course of the stations moving with respect to each other. It is to be noted that the power source for this communication system is part of the vari-loops in each case.

One may think of the diodes 15–21 as being linked by the conductors 13 or just the reverse. In either case the elements 13 as shown here have such a low resistance as to be shunts in affect. Together the conductors 13 and the diodes 15–21 are a major portion of the message carrying conductors for the system. As can be seen they are arranged in a repeating sequence with respect to each other.

In the drawing, the second station is shown in two different positions one of which has already been described and it is labeled A. The other is labeled B and is merely A in another position. For this reason all the parts are given the same number designations as are the parts in A with a *b* added as a suffix to avoid confusion between the two views when describing operation of the device.

FIG. 2 shows a system in which there is a station 29 that is a part of loop 30. Again the loop is made up of elements that offer different resistance to the flow of current connected in a repeating sequential pattern. Station 29 includes a control device, here switch 31, and a signal recognizing device such as meter 32. Loop 30 is made up of one-direction current flow devices 34–40 which again will be referred to as diodes but in a generic sense of one-direction current flow devices.

In this circuit also there is a second station identified in the drawing by the number 41. The second station is again variably connected to the loop by the brushes 42 and 44. A variable source of electrical energy is provided in the second station circuit exemplified by the batteries 45 and 46. An appropriately connected control device makes the selection of varying electrical energy possible and the double pole double throw switch 47 (DPDT) is a way of doing this. As seen in FIG. 2, switch 47 is also connected to the signal sensor and resistance 48 which in turn is connected to the control device, here switch 49. Battery 45 and switch 49 are connected to the brushes 42 and 44 respectively.

Again, the second station 41B is merely station 41 in a different position. Again the same numbers are used as in connection with 41A except that the suffixes *b* are used to keep the two situations clearly distinguishable in discussing operation. Station 22 in FIG. 1 and station 41 in FIG. 2 are called vari-loops to distinguish them from the loops 14 and 30 respectively.

In FIG. 3 the loop 50 is made up of conductors 51 which connect the switches 52. Station 54 includes the power source 55, here a battery, a series switch 56 and the signal recognizers 57 and 58. A switch 59 is connected to shunt across signal recognizer 58.

Station 60, the vari-loop in FIG. 3, is positioned with its brushes 61 and 62 abridging one of the switches 52. A series switch 64 is in the circuit for the two signal recognizer 65 and 66. Station 60 also has a shunt switch 67 which, when closed, bypasses signal recognizer 66.

OPERATION

Referring back to FIG. 1 while it seems generally that the vari-loop is better suited to be the movable station than the loop, it is possible that there are situations in which the loop may be more effectively or at least just as effectively the movable station. Still it is easier to describe the operation if one or the other is described as moving rather than referring constantly to relative motion and the vari-loop will be described as the moving station with the understanding that the situation could be reversed.

Assuming station 22 to be as shown at A, current cannot flow from battery 26 through brush 24 to brush 25 and back to the battery through resistance 27 because it is blocked by diode 16. If switch 11 is closed as shown, however, then the current does have a path through the loop and back to battery 26. When the current flows in this manner, both of the lamps 12 and 27 are lit. Furthermore, signals may be given to station 22 from station 10 by opening and closing switch 11.

As station 22 is moved along loop 14 to position 22B, brushes 24 and 25 are alternately between diodes 16 and 17 and bridging diode 17 until position B is reached. When station 22 is in the position B, lamp 27B is lit because brushes 24B and 25B are both contacting the same conductor. As the route of least resistance for the current is through the conductor and back to the battery 26B, no current will flow loop 14. In the course of reaching position B, station 22 was in a similar situation when it was between diodes 16 and 17. By counting when lamp 12 goes off and on, the number of diodes that have been passed can be determined and hence the location of station 22.

With reference to the structure shown in FIG. 2, the general operation is very similar to that in FIG. 1. The principal difference is that in FIG. 2 structure vari-loop 41 has a controllable signalling device in switch 49 so that signals may be sent and received at station 29 or station 41 in position A or any similar position, i.e. when brushes 42 and 44 are bridging any one of the diodes 34–40. Furthermore, the signal recognizing devices shown in this Figure, meters 32 and 48, can discriminate between the varied forms of electrical energy that are available by means of switch 47 and the two batteries 45 and 46. In other words, not only can the position of station 41 be determined but an instant disclosure of whether two or four volts are being applied can be communicated.

The operation of the system in FIG. 3 in generating position indicating signals is very like the circuits in FIGS. 1 and 2. When the loop 54 and vari-loop 60 are positioned as shown, the bridges switch 52 is opened, as for example as a limit switch is. Since current from battery 55 must then flow through vari-loop 60. If switch 64 is closed and switch 67 is open, both of the signal recognizers 65 and 66 are activated. Similarly, with circuit as shown, both of the signal recognizers 57 and 58 are energized. Opening either switch 56 or 64 will cause the circuit to be broken causing a change in the signal recognizers. When the series switches (56 and 64) are closed and either of the bypass switches 59 and 67 are closed, a recognizable change in the signal recognizers will occur. Furthermore, if only one of the switches 59 and 67 is closed and the other is then closed, a still different change in the recognizers occurs. While the power source has been shown in FIG. 3 to be in the loop, the system can function with a power source in loop and/or the vari-loop. This is the principal advantage gained by using mechanical instead of electrical switching.

Still further flexibility of the system shown in FIG. 3 can be achieved by combining it with the variable energy source concept of FIG. 2.

The invention is defined as required by law in the following claim:

1. An electrical communication system of the conductor type comprising:

A. a loop comprising:
  - 1. a plurality of diodes,
  - 2. a plurality of conductors connecting said diodes into a series circuit with the diodes all oriented in the same direction;

B. a vari-loop comprising:
  - 1. a pair of spaced brushes in sliding contact electrically with the conductors of (A. 2.); said brushes both being in contact with one conductor or in the alternative each being in contact with a different conductor;
  - 2. a one direction source of electrical energy;
  - 3. and vari-loop conductors connecting said brushes to said source of electrical energy; and C. an electrical signal recognizing device connected into at least one of said loop and said vari-loop.

* * * * *